(12) United States Patent
Kadohara

(10) Patent No.: US 8,144,217 B2
(45) Date of Patent: Mar. 27, 2012

(54) IMAGE SENSING APPARATUS

(75) Inventor: Terutake Kadohara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1148 days.

(21) Appl. No.: 10/664,508

(22) Filed: Sep. 16, 2003

(65) Prior Publication Data

US 2004/0090538 A1    May 13, 2004

(30) Foreign Application Priority Data

Sep. 19, 2002 (JP) .................................. 2002-273024

(51) Int. Cl.
*H04N 5/235* (2006.01)
*H04N 9/07* (2006.01)
*H04N 9/09* (2006.01)
*H04N 9/097* (2006.01)

(52) U.S. Cl. ..................................... 348/230.1; 348/262

(58) Field of Classification Search .................. 348/262, 348/263, 315, 218.1, 267, 264, 266, 268, 348/272, 275, 273, 255, 265, 282, 320, 322; 438/80

See application file for complete search history.

(56) References Cited

U.S. PATENT DOCUMENTS

| | | | | |
|---|---|---|---|---|
| 5,610,390 A * | 3/1997 | Miyano | .................. | 250/216 |
| 5,986,704 A * | 11/1999 | Asai et al. | .................. | 348/340 |
| 6,002,145 A * | 12/1999 | Niisoe | .................. | 257/222 |
| 6,069,973 A * | 5/2000 | Lin et al. | .................. | 382/167 |
| 6,075,905 A * | 6/2000 | Herman et al. | .................. | 382/284 |
| 6,344,666 B1 * | 2/2002 | Yamaguchi et al. | .................. | 257/98 |
| 6,571,022 B2 * | 5/2003 | Okisu et al. | .................. | 382/294 |
| 6,771,814 B1 * | 8/2004 | Nakajima | .................. | 382/168 |
| 6,791,615 B1 * | 9/2004 | Shiomi et al. | .................. | 348/323 |
| 7,042,491 B2 * | 5/2006 | Saito et al. | .................. | 348/139 |
| 7,072,509 B2 * | 7/2006 | Hunter et al. | .................. | 382/167 |
| 7,164,506 B2 * | 1/2007 | TeWinkle | .................. | 358/474 |
| 7,295,238 B2 | 11/2007 | Tanaka et al. | | |
| 2001/0039061 A1 * | 11/2001 | Suzuki et al. | .................. | 438/1 |
| 2002/0025164 A1 * | 2/2002 | Suzuki | .................. | 396/429 |
| 2002/0039489 A1 * | 4/2002 | Matsuda | .................. | 396/91 |

(Continued)

FOREIGN PATENT DOCUMENTS

EP           1037458     *   9/2000

(Continued)

OTHER PUBLICATIONS

Japanese Office Action issued on Nov. 6, 2007 concerning the basic Japanese Patent Application No. 2002-273024, which is a foreign counterpart to the present application (an English Translation thereof are provided).

*Primary Examiner* — Sinh Tran
*Assistant Examiner* — Albert Cutler
(74) *Attorney, Agent, or Firm* — Cowan, Liebowitz & Latman, P.C.

(57) ABSTRACT

An object of this invention is to obtain a high-quality image free from any variation between image sensing regions. To achieve this object, an image sensing apparatus according to this invention includes an image sensing element which is formed on a semiconductor substrate on which at least one of a semiconductor layer, a color filter layer, and a microlens layer is formed by a plurality of divisional exposure operations, and a correction device which corrects variations in a signal output from the image sensing element between a plurality of partial image sensing regions formed by the plurality of divisional exposure operations.

6 Claims, 10 Drawing Sheets

U.S. PATENT DOCUMENTS

2002/0067416 A1* 6/2002 Yoneda et al. .................. 348/304
2003/0006363 A1* 1/2003 Campbell et al. .......... 250/208.1

FOREIGN PATENT DOCUMENTS

| | | |
|---|---|---|
| JP | 64-141881 A | 6/1989 |
| JP | 11-220116 A | 8/1999 |
| JP | 2000-253305 | 9/2000 |
| JP | 2002-125156 A | 4/2002 |
| JP | 2002-252808 A | 9/2002 |
| JP | 2003-348604 A | 12/2003 |

* cited by examiner

FIG. 3

| A | - | A | 1 | 1 | - | 1 | 1 | a | - | a |
|---|---|---|---|---|---|---|---|---|---|---|
| B | - | B | 1 | 1 | - | 1 | 1 | b | - | b |
| C | - | C | 1 | 1 | - | 1 | 1 | c | - | c |
| D | - | D | 1 | 1 | - | 1 | 1 | d | - | d |
| E | - | E | 1 | 1 | - | 1 | 1 | e | - | e |
| F | - | F | 1 | 1 | - | 1 | 1 | f | - | f |

| LEFT REGION | CENTRAL REGION | RIGHT REGION |

IMAGE SENSING APPARATUS

FIELD OF THE INVENTION

The present invention relates to an image sensing apparatus which senses an object image.

BACKGROUND OF THE INVENTION

An example of the arrangement of a conventional digital still camera will be described with reference to FIG. 7.

In FIG. 7, when the photographer operates a camera operation switch 201 (comprised of, e.g., the main switch and release switch of a camera), an overall control CPU 200 detects a change in the state of the camera operation switch 201, and starts supplying power to other circuit blocks.

An object image within the photographing frame range is formed on an image sensing element 204 via main photographing optical systems 202 and 203, and converted into an analog electrical signal. The analog electrical signal from the image sensing element 204 is subjected to analog processing by a CDS/AGC circuit 205, converted into a predetermined signal level, and converted into a digital signal for each pixel by an A/D converter 206.

A driver circuit 207 controls horizontal driving and vertical driving of the image sensing element 204 on the basis of a signal from a timing generator 208 which determines the driving timing of the whole system. The image sensing element 204 then outputs an image signal.

Similarly, the CDS/AGC circuit 205 and A/D converter 206 also operate on the basis of timings from the timing generator 208.

Reference numeral 209 denotes a selector which selects a signal on the basis of a signal from the overall control CPU 200. An output from the A/D converter 206 is input to a memory controller 215 via the selector 209, and all signal outputs are transferred to a frame memory 216. In this case, all pixel data of photographing frames are temporarily stored in the frame memory 216. For sequential shooting or the like, all pixel data of photographed images are written in the frame memory 216.

After the end of write in the frame memory 216, the contents of the frame memory 216 which stores pixel data are transferred to a camera digital signal processor (DSP) 210 via the selector 209 under the control of the memory controller 215. The camera DSP 210 generates R, G, and B color signals on the basis of pixel data of each image stored in the frame memory 216.

Before normal photographing, the generated R, G, and B color signals are periodically (every frame) transferred to a video memory 211, obtaining a viewfinder display or the like by a monitor display 212.

When the photographer designates photographing (i.e., image recording) by operating the camera operation switch 201, pixel data of one frame are read out from the frame memory 216 in accordance with a control signal from the overall control CPU 200, subjected to image processing by the camera DSP 210, and temporarily stored in a work memory 213.

Data in the work memory 213 is compressed by a compression/decompression unit 214 on the basis of a predetermined compression format. The compressed data is stored in an external nonvolatile memory 217 (generally, a nonvolatile memory such as a flash memory is used).

To observe photographed image data, data which is compressed and stored in the external memory 217 is decompressed into normal data of each pixel via the compression/decompression unit 214. The decompressed data of each pixel is transferred to the video memory 211, allowing to observe the photographed image via the monitor display 212.

In this manner, in a general digital camera, an output from the image sensing element 204 is converted into actual image data via the signal processing circuit in almost real time, and the result is output to the memory or monitor circuit.

In such digital camera system, compatibility with a silver halide film such as a 135 format film camera system is important particularly for an interchangeable lens type single-lens reflex camera.

The lens can be used as far as the mount is common. However, the photographing view angle, i.e., focal length suffers a difference in size between the image sensing element and the film.

At present, the size of the image sensing element which can be manufactured at once is limited owing to the manufacturing apparatus, i.e., so-called stepper. Also in terms of cost, the image sensing element is generally smaller than the film. Considering the same photographing sense as that for the film, and particularly photographing with a wide-angle lens, an image sensing element equal in size to a silver halide film is desirable.

As one measure, FIG. 8 schematically shows one image sensing element such as a CCD which is constituted by joining in three-divisional exposure (to be referred to as joint exposure hereinafter).

In FIG. 8, one image sensing element is divided into three, left, center, and right regions. The regions are exposed to individual masks and finally joined into one image sensing element. In FIG. 8, joint exposure is executed in a vertical structure of a semiconductor layer, on-chip color filer layer, and on-chip microlens layer to constitute an image sensing element equal in size to the film.

FIG. 9 is a view for explaining a semiconductor layer when the image sensing element in FIG. 8 is a CCD. In this CCD, the charges of pixels generated in a photodiode 190 are transferred at once to vertical CCDs 191 at a predetermined timing. The charges in the vertical CCDs 191 on all lines are transferred to horizontal CCDs 192, 193, and 194 at the next timing.

In the arrangement shown in FIG. 9, the horizontal CCDs 192, 193, and 194 transfer charges to a common amplifier 195 every transfer clock. An amplified output is read out via common CDS/AGC circuits 196 and 198.

Such CCD can be used similarly to a general image sensing element as far as joint exposure is successful.

Even in the CCD of FIG. 9 which looks like a general image sensing element, a shift by joint exposure actually exists in each vertical structure of a semiconductor layer, on-chip color filter layer, and on-chip microlens layer. The output level varies between the three regions.

Especially, the on-chip color filter layer and on-chip microlens layer readily shift, and the influence appears as a step in the gain direction. In particular, the on-chip color filter layer is exposed for each color, the shift varies, and the step varies between colors.

As shown in FIG. 10, the regions may twist in the plane (two-dimensionally), resulting in a very complicated shift.

SUMMARY OF THE INVENTION

The present invention has been made to overcome the conventional drawbacks, and has as its object to obtain a high-quality image free from any variation between image sensing regions.

To solve the above problems and achieve the above object, according to the first aspect of the present invention, an image sensing apparatus is comprising an image sensing element which is formed on a semiconductor substrate on which at least one of a semiconductor layer, a color filter layer, and a microlens layer is formed by a plurality of divisional exposure operations, and a correction device which corrects variations in a signal output from the image sensing element between a plurality of partial image sensing regions formed by the plurality of divisional exposure operations.

According to the second aspect of the present invention, an image sensing apparatus comprises an image sensing element on which color filters of a plurality of colors for sensing an object image are formed, and a correction device which divides an image sensing region of the image sensing element into a plurality of partial image sensing regions, and corrects variations between the partial image sensing regions by using a different correction value for each color.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 3 is a table for explaining a correction value table according to the first embodiment of the present invention;

DETAILED DESCRIPTION OF THE PREFERRED EMBODIMENTS

An image sensing signal correction method and image sensing apparatus according to preferred embodiments of the present invention will be described in detail below with reference to the accompanying drawings.

First Embodiment

Figure 1:
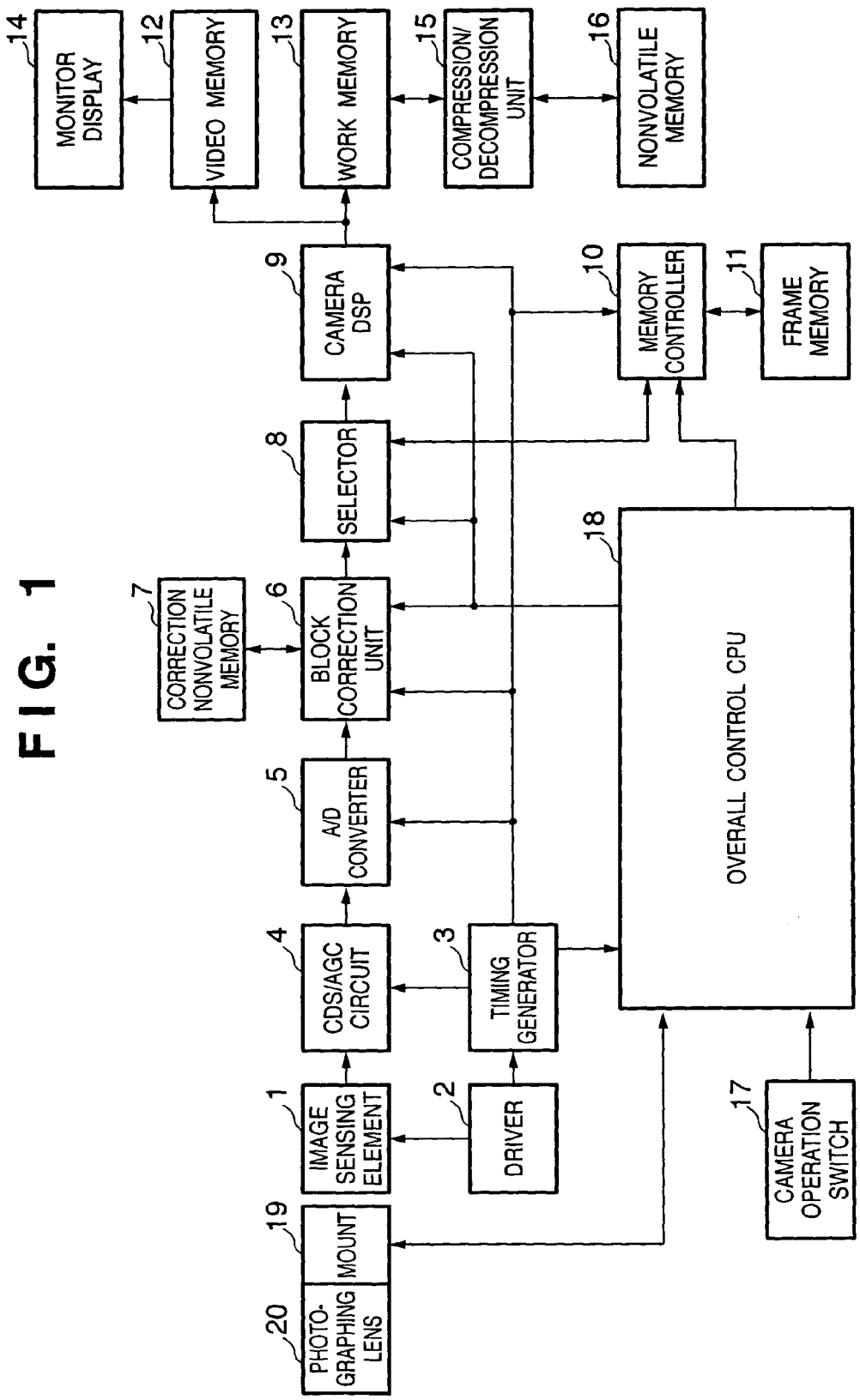
FIG. 1 is a block diagram for explaining the arrangement of a digital camera according to the first embodiment of the present invention.

FIG. 1 is a block diagram showing an image sensing apparatus (digital camera) according to the first embodiment of the present invention.

Figure 7:
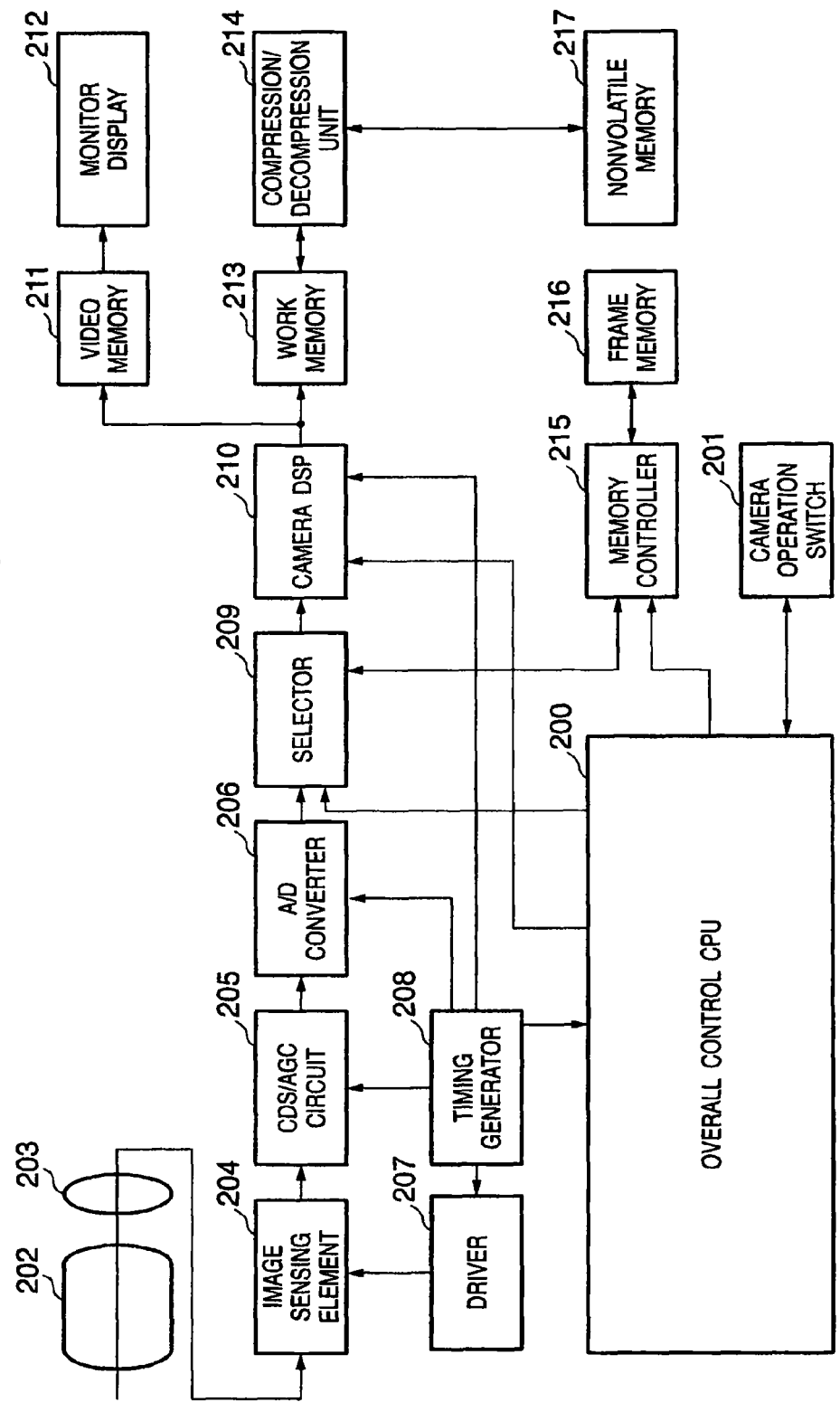
FIG. 7 is a block diagram for explaining the arrangement of a conventional digital camera.
Figure 8:
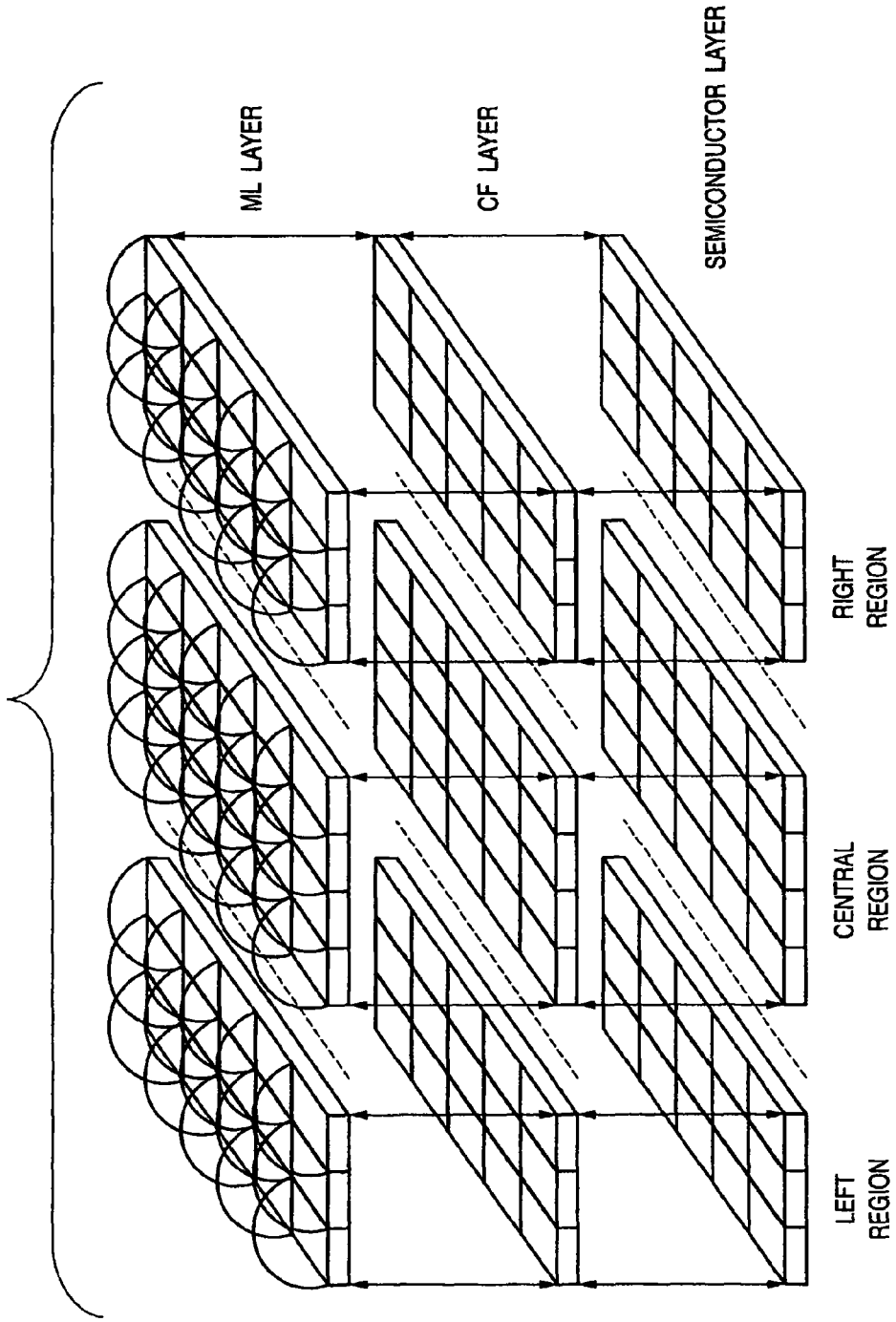
FIG. 8 is a view for explaining joint exposure.
Figure 9:
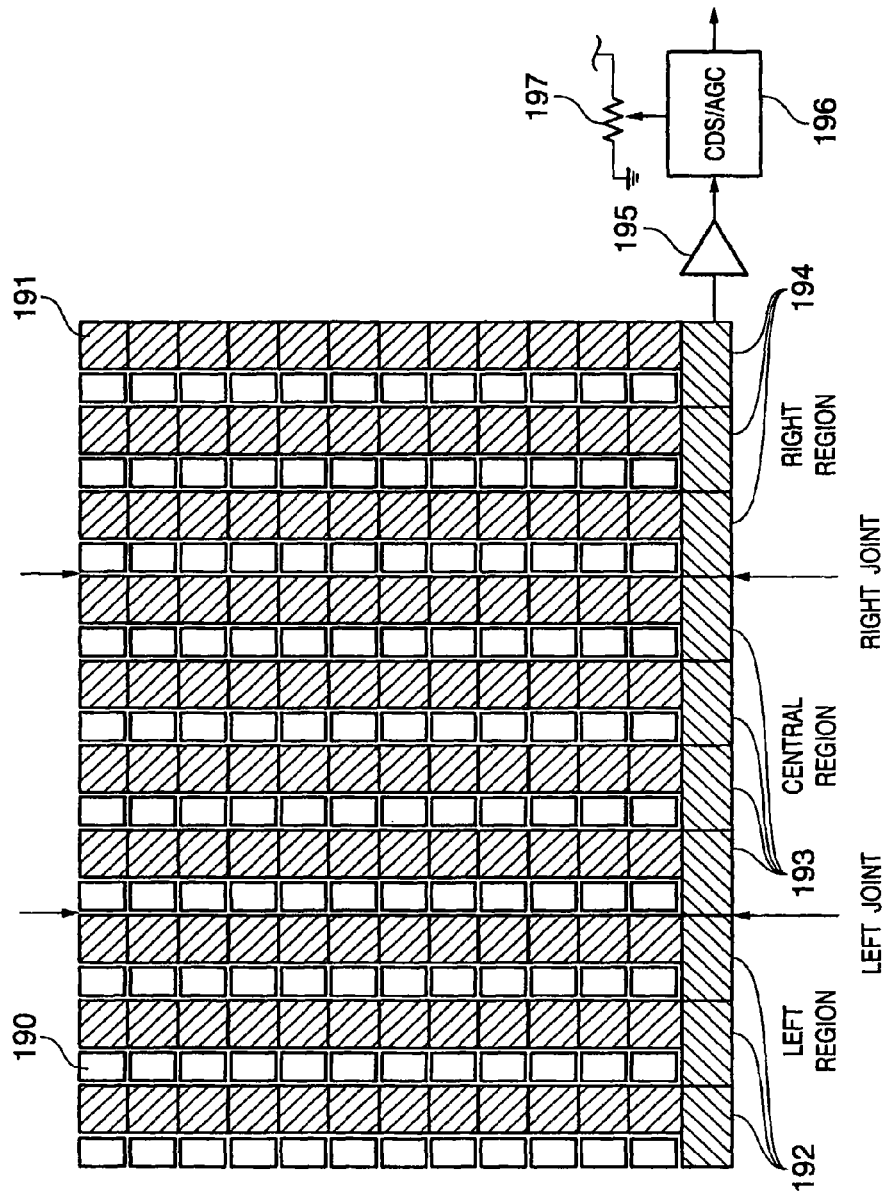
FIG. 9 is a view for explaining a semiconductor image sensing element by joint exposure.
Figure 10:
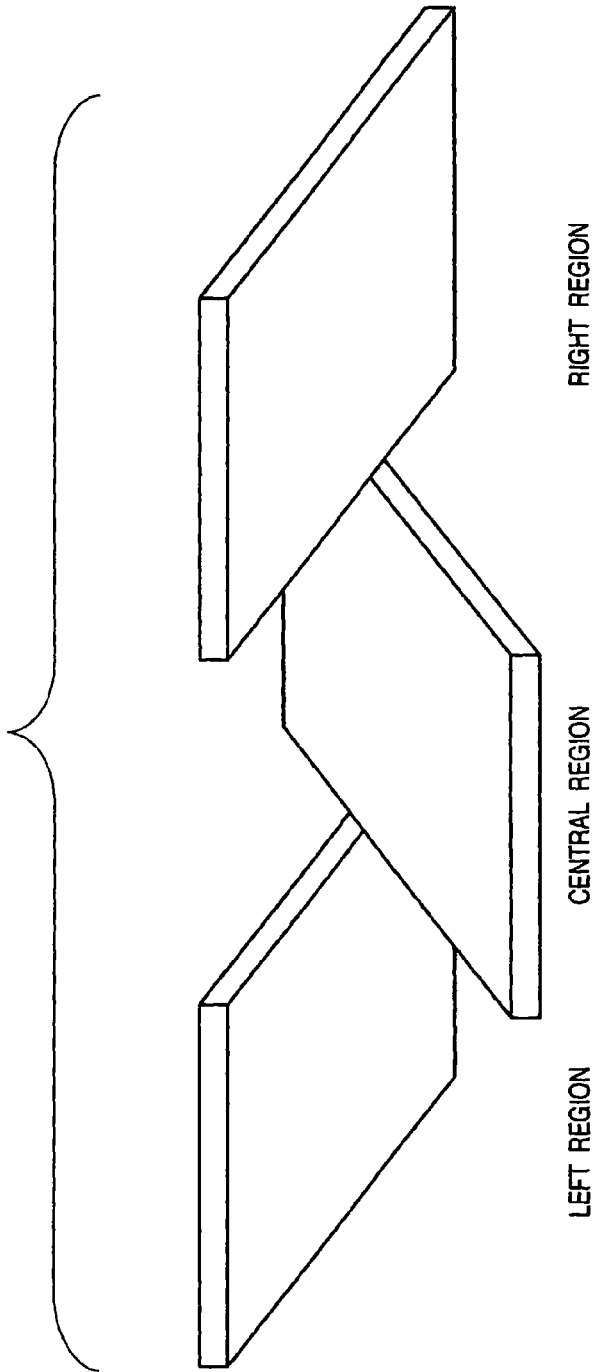
FIG. 10 is a view for explaining an example of a shift by joint exposure.

This image sensing apparatus is basically constituted by adding a block correction unit 6 and a correction nonvolatile memory 7 for storing a correction value to the arrangement of FIG. 7.

In FIG. 1, reference numeral 1 denotes an image sensing element which is driven and controlled similarly to a general element though the image sensing element 1 is constituted by joint exposure. The image sensing element 1 is driven by a driver 2 and operates at a predetermined frequency. A timing generator 3 is a timing generation circuit which outputs a vertical sync signal VD and horizontal sync signal HD. The timing generator 3 simultaneously supplies timing signals to circuit blocks.

A pixel signal from the image sensing element 1 is input to a CDS/AGC circuit 4, and subjected to processing such as known correlated double sampling to remove reset noise contained in an output from the CCD or the like. The output is amplified to a predetermined signal level. The amplified pixel signal is converted into a digital signal by an A/D converter 5, thus obtaining a digital pixel signal.

The digital pixel signal is sent to the block correction unit 6 where a shift by joint exposure is corrected. The block correction unit 6 loads a correction value for each block from the correction nonvolatile memory in accordance with an instruction from an overall control CPU, and performs correction (to be described later) for the digital pixel signal in accordance with a timing signal from the timing generator 3.

Information of a photographing lens 20 is transferred to an overall control CPU 18 via a mount 19 (camera & lens mount). To switch a correction value for each block by the photographing lens, the overall control CPU 18 sends an instruction to this effect to the block correction unit 6. This will also be described later.

The corrected pixel signal is input to a memory controller 10 via a selector 8, and all signal outputs are transferred to a frame memory 11. In this case, all pixel data of photographing frames must be temporarily stored in the frame memory 11. For sequential shooting or the like, all pixel data of photographed images are written in the frame memory 11.

After the end of write in the frame memory 11, the contents of the frame memory 11 which stores pixel data are transferred to a camera digital signal processor (DSP) 9 via the selector 8 under the control of the memory controller 10. The camera DSP 9 generates R, G, and B color signals on the basis of pixel data of each corrected image stored in the frame memory 11.

When the photographer designates photographing (i.e., image recording) by operating a camera operation switch 17, pixel data of one frame are read out from the frame memory 11 in accordance with a control signal from the overall control CPU 18, subjected to image processing by the camera DSP 9, and temporarily stored in a work memory 13.

Data in the work memory 13 is compressed by a compression/decompression unit 15 on the basis of a predetermined compression format. The compressed data is stored in an external nonvolatile memory 16 (generally, a nonvolatile memory such as a flash memory is used).

To observe photographed image data, data which is compressed and stored in the external memory 16 is decompressed into normal data of each pixel via the compression/decompression unit 15. The decompressed data of each pixel is transferred to a video memory 12, allowing to observe the photographed image via a monitor display 14.

The arrangement of FIG. 1 assumes that the burden of signal processing in the camera DSP 9 is not increased. If the system has a margin for signal processing in the camera DSP 9, shift correction may also be performed in the camera DSP.

Correction of a shift caused by joint exposure will be explained.

As described above, an on-chip color filter layer and on-chip microlens layer readily shift, and the influence appears as a step in the gain direction. In particular, the on-chip color filter layer is exposed for each color, the shift varies, and the step varies between colors.

To solve this problem, the first embodiment executes correction with a correction value obtained by storing or calculating in advance a correction value for each block which subdivides a divided exposure region and includes a plurality of pixels.

FIGS. 2A to 2D are views for explaining division into blocks.

Figure 2C:
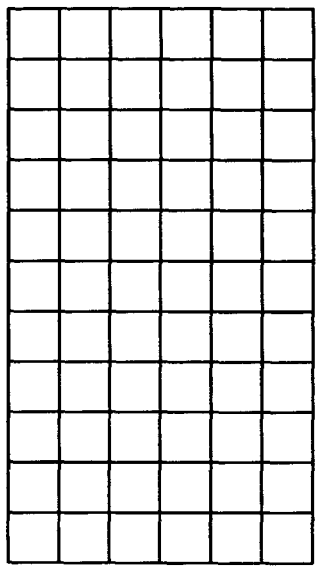
FIGS. 2A to 2D are views for explaining block division according to the first embodiment of the present invention.
Figure 2D:
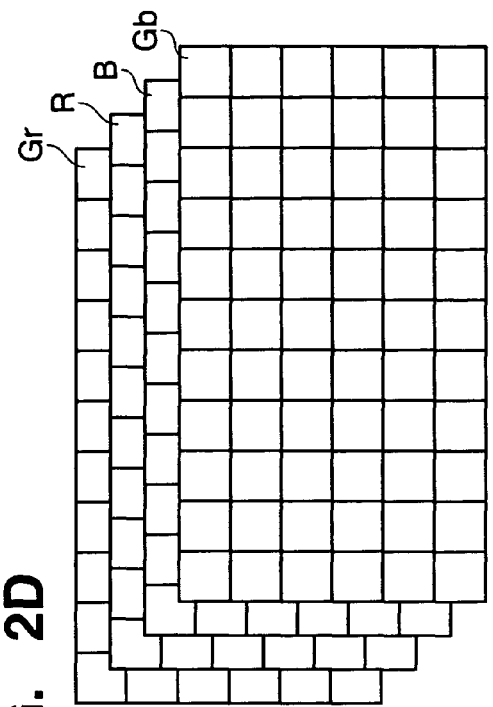
Figure 2A:
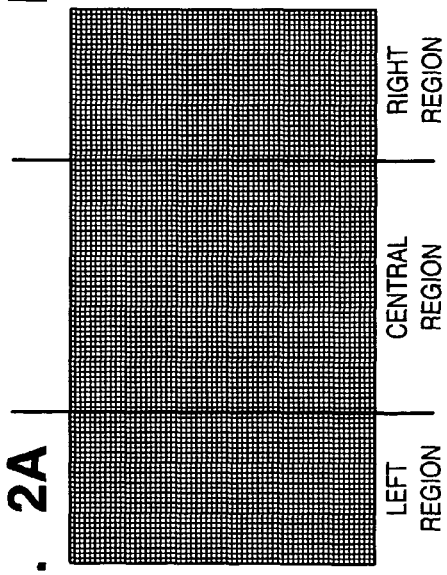
Figure 2B:
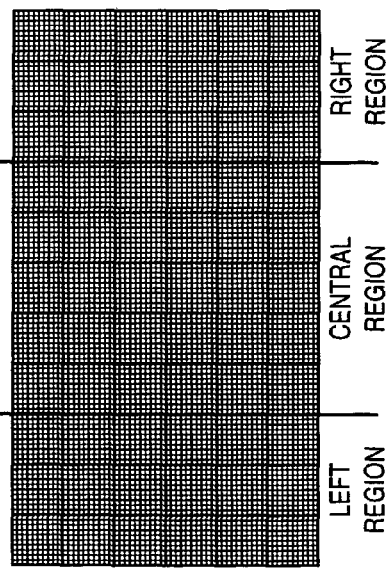

As shown in FIG. 2A, the image sensing element undergoes joint exposure at two, right and left joints, and one image sensing element is constituted by joining three, left, center, and right regions. As shown in FIG. 2B, the image sensing element is divided into a plurality of blocks by using the right and left joints as division boundaries. In this case, the image sensing element is divided into six in the vertical direction×11 in the horizontal direction. Blocks as shown in FIG. 2C are formed from the entire image sensing element, and serve as a correction value table. The first embodiment adopts a correction value corresponding to each color of the on-chip color filter. For example, for a general Bayer filter, a correction value table having four planes is prepared, as shown in FIG. 2D.

As the number of blocks increases, the precision is considered to increase. However, this increases the memory area of the system, and thus the number of blocks must be determined in consideration of the balance with the effect.

The form of the correction value will be explained.

The correction value is one in the gain direction. Pixel signals on two sides at a joint are multiplied by correction values so as to eliminate any steps at the right and left joints.

As correction values to be obtained, the first embodiment obtains correction values in the right and left regions by using as a reference a signal in a divided exposure region including the optical axis of a photographing optical system, i.e., the central region in this embodiment.

This is because the center of the frame is designed to be directly used. The center of the frame often provides an object to be observed, and is determined to be kept unchanged in order to fully exploit the performance of the image sensing optical system.

A shift is so corrected as to eliminate any step at a joint. This purpose is primarily achieved. In other words, other portions are processed by other correction operations. An independent correction value is used in the boundary direction at the joint, and the same correction value as that at the end of the boundary is used in a direction perpendicular to the boundary direction.

From this viewpoint, one correction value table is shown in FIG. 3.

In FIG. 3, all correction values in the central region are 1. In the right and left regions, blocks along each joint are assigned values optimal for them. In a direction perpendicular to the joint (horizontal direction in FIG. 3), the same correction value as that of a block along the joint is set. With this setting, even if, e.g., the peripheral light quantity changes at the periphery, a natural change can be maintained.

The correction value is switched for a target lens when a shift cannot be satisfactorily corrected unless the correction value is changed owing to, e.g., the pupil distance or F-number of a photographing lens.

Figure 4:
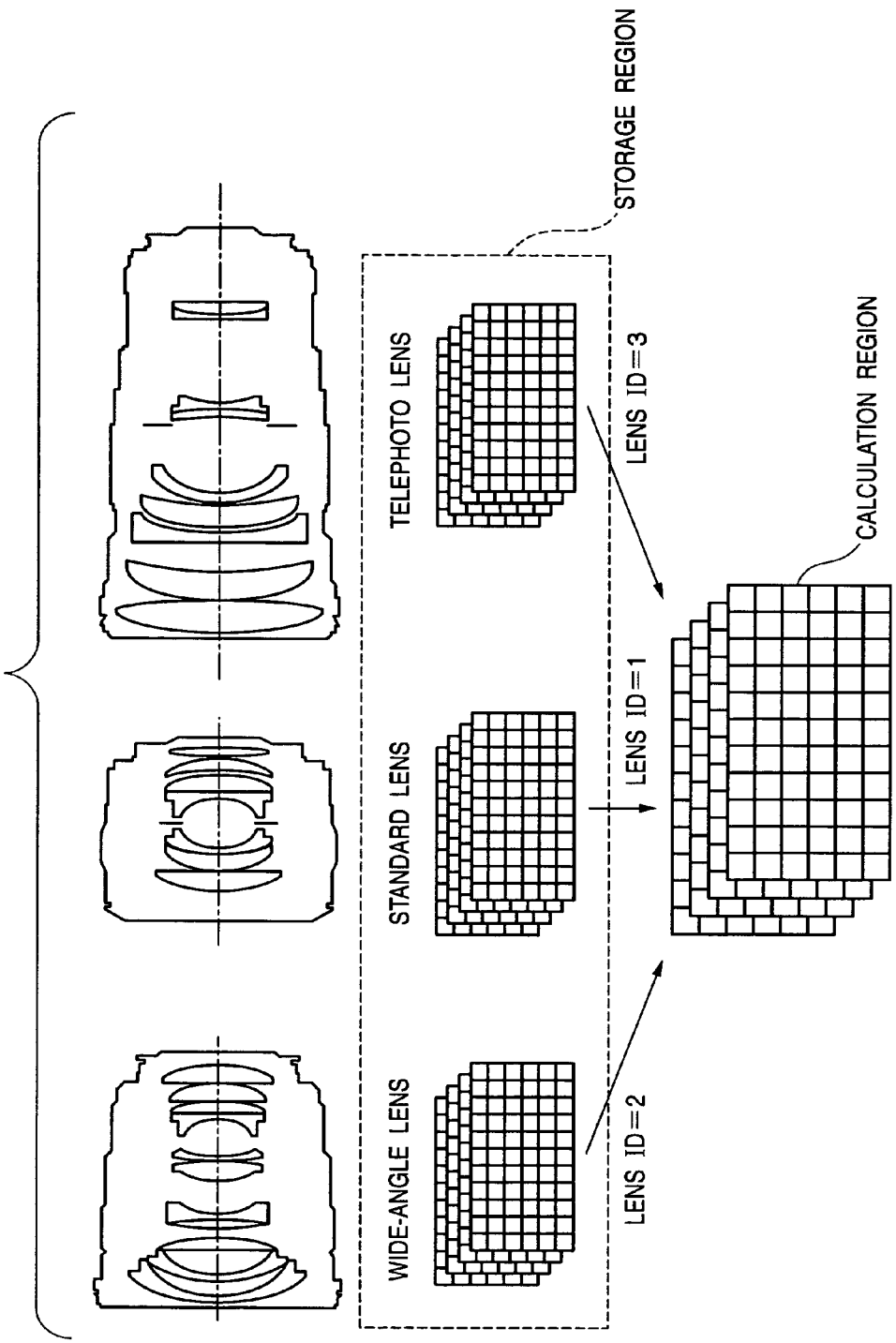
FIG. 4 is a view for explaining an expanded correction value table according to the first embodiment of the present invention.

FIG. 4 is a view for explaining this. Especially in an interchangeable lens for a single-lens reflex camera system, the pupil distance changes depending on the focal length. To cope with this, three correction values are prepared for a standard lens, telephoto lens, and wide-angle lens, and stored in the correction value nonvolatile memory. When the photographing lens 20 is mounted on the camera, an optimal correction value table is sent to the correction calculation region of the block correction unit 6 on the basis of lens identification information (lens ID) obtained via the mount 19. Satisfactory shift correction can always be achieved.

Instead of changing the correction value on the basis of the lens ID as information on a mounted lens, the correction value may be changed or calculated on the basis of information on the pupil distance or F-number.

Second Embodiment

In the first embodiment, the read system of the image sensing element 1 has only one channel. In the second embodiment, a read system capable of high-speed read has two channels.

Figure 5:
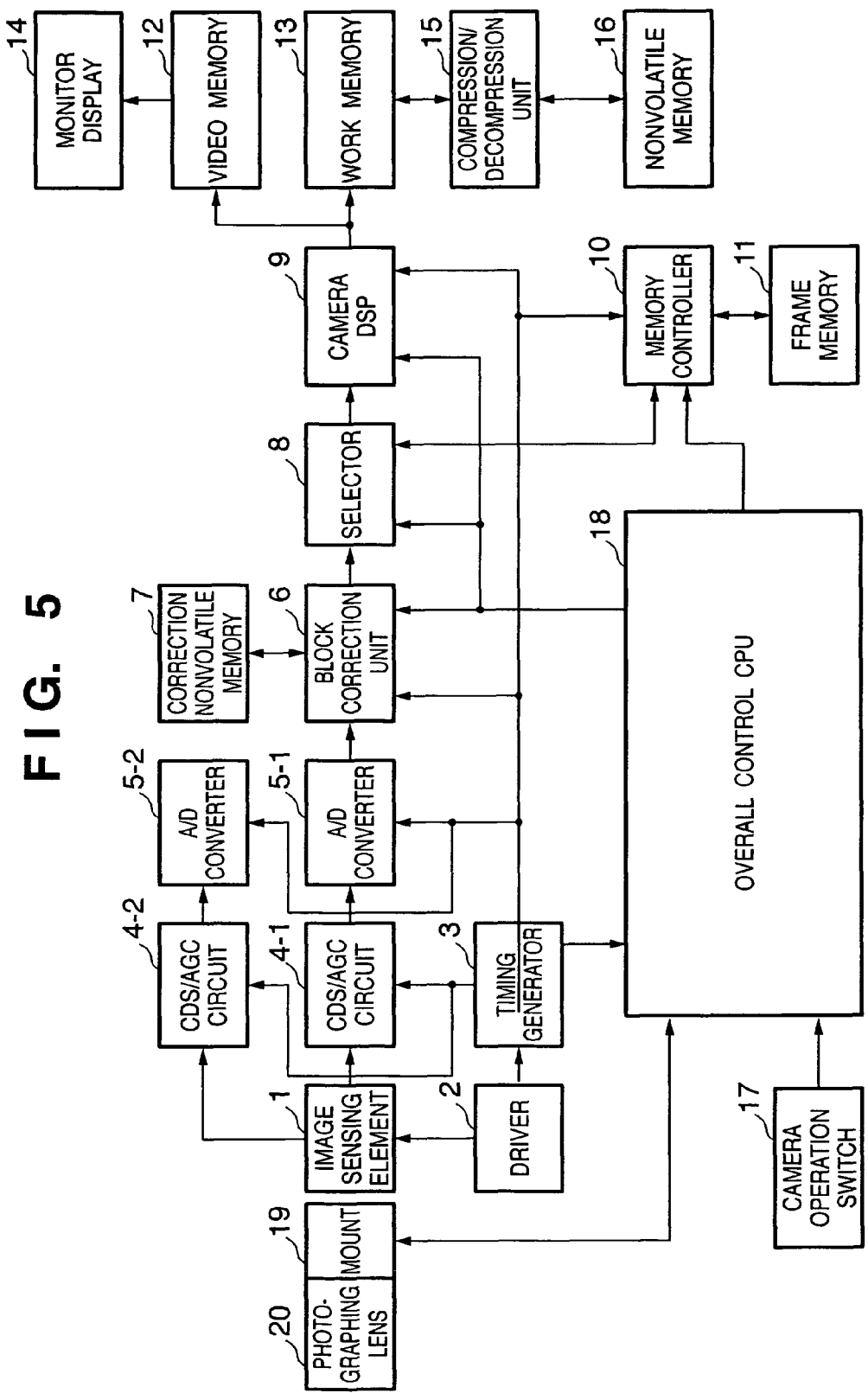
FIG. 5 is a block diagram for explaining the arrangement of a digital camera according to the second embodiment of the present invention.

FIG. 5 is a block diagram showing an image sensing apparatus (digital camera) in which the read system of an image sensing element 1 has two channels.

Since importance is placed on high-speed processing, two CDS/AGC circuits 4-1 and 4-2 and two A/D converters 5-1 and 5-2 are added to the block diagram of FIG. 1.

The image sensing element 1 adopts various read methods by the two systems. Signals may be read out divisionally from right and left regions at the center of the element surface, as disclosed in Japanese Patent Laid-Open No. 2000-253305 as shown in FIG. 6A. Instead, signals may be alternately read out every line (FIG. 6B). Signals may be read out by subdividing the region within the image sensing element, and multiplexed into two channels in externally outputting the signals (FIG. 6C).

In these cases, a shift generated by the difference in read system must be coped with.

The measure changes depending on a combination with the arrangement of an on-chip color filter. For example, when the Bayer array is employed, the methods in FIGS. 6A and 6B can be realized even by one set of block correction tables.

Figure 6C:
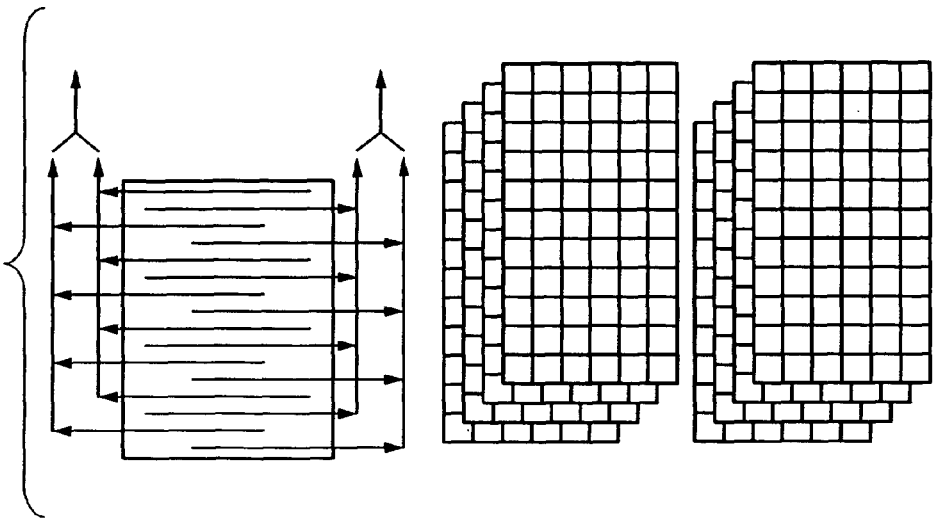
FIGS. 6A to 6C are views for explaining a correction value table according to the second embodiment of the present invention.
Figure 6B:
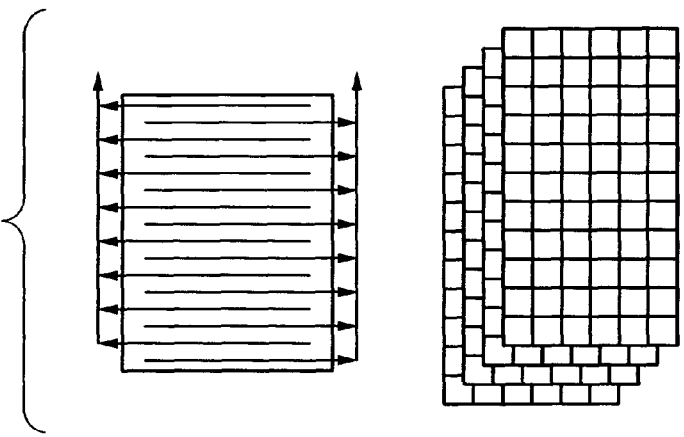
Figure 6A:
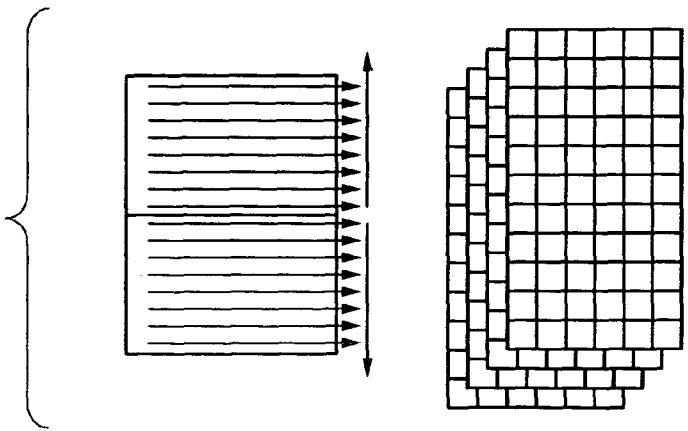

The method of FIG. 6C requires two sets of block correction values unless the shift between a plurality of systems is corrected by any method. This is because a shift occurs between the two read channels even with the same color of the on-chip color filter.

As described above, according to the first and second embodiments, the signal difference between a plurality of regions can be corrected when the image signal region of an image sensing element in an image sensing apparatus is formed by joint exposure and the sensitivity becomes nonuniform in the two-dimensional direction.

Even if nonuniformity changes depending on the optical factor of a photographing optical system such as the exit pupil position or F-number, a signal difference can be more properly corrected.

In read by many systems, the signal difference between a plurality of regions including the shift between a plurality of read channels can be corrected.

The above embodiments can obtain a high-quality image free from any variation between image sensing regions.

The present invention is not limited to the above embodiments and various changes and modifications can be made within the spirit and scope of the present invention. Therefore, to apprise the public of the scope of the present invention the following claims are made.

What is claimed is:

1. An image sensing apparatus comprising:
an image sensing element includes a first light receiving area and a second light receiving area which are formed on an image pickup surface of a semiconductor substrate by a plurality of divisional joint exposure operations, wherein the image pickup surface has on-chip color filter layer and on-chip micro lens layer on a semiconductor layer, wherein there is a shift between the on-chip color filter layer and the on-chip micro lens layer of the first receiving area and the on-chip color filter layer and the on-chip micro lens layer of the second light receiving area, and wherein pixel signals obtained by the first light receiving area and the second light receiving area are read out from the image sensing element via a same channel;
a correction device which corrects difference between output levels of pixel signals output from the first light receiving area and the second light receiving area via the same channel, wherein the difference between levels of the signals is a level difference caused by the shift between the on-chip color filter layer and the on-chip micro lens layer of the first receiving area and the on-chip color filter layer and the on-chip micro lens layer of the second light receiving area; and
a control device which controls to write a signal corrected by said correction device to a frame memory.

2. The apparatus according to claim 1, wherein said correction device divides the light receiving areas into a plurality of blocks, and performs correction using a different correction value for each block.

3. The apparatus according to claim 1, wherein the light receiving areas include at least three partial image sensing regions in one direction, and said correction device corrects at least two of the three partial image sensing regions with correction values by using as a reference a central partial image sensing region selected from the three partial image sensing regions.

4. The apparatus according to claim 1, wherein said correction device performs correction using different correction values in a boundary direction between the light receiving areas.

5. The apparatus according to claim 1, wherein said correction device performs correction using a different correction value for each color.

6. The apparatus according to claim 1, wherein said correction device simultaneously corrects, by a gain correction, a difference between levels of output signals from the first light receiving area and the second light receiving area, and a difference between levels of output signals of output channels included in the same channel.

* * * * *